Figure 1:
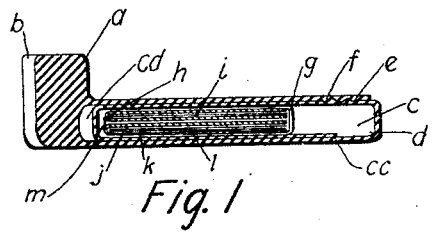

Dec. 8, 1925.       M. PEYSER       1,564,269

INTRAORAL X-RAY FILM AND SCREEN HOLDER AND POUCH

Filed Jan. 31, 1922

INVENTOR
MICHAEL PEYSER
BY HIS ATTORNEY

Patented Dec. 8, 1925.

1,564,269

UNITED STATES PATENT OFFICE.

MICHAEL PEYSER, OF JERICHO TURNPIKE, LONG ISLAND, NEW YORK.

INTRAORAL X-RAY FILM AND SCREEN HOLDER AND POUCH.

Application filed January 31, 1922. Serial No. 532,980.

*To all whom it may concern:*

Be it known that I, MICHAEL PEYSER, residing at Jericho Turnpike, Long Island, borough of Queens, State of New York, have invented a new and useful Intraoral X-Ray Film and Screen Holder and Pouch, of which the following is a specification.

My invention relates to the dental and oral X-ray picture taking and developing of prognostatic films and their application.

The objects of my invention, are, to enable the proper and efficient use of double intensifying screens intraorally in the taking of X-ray picture dental and oral, and to permit the use of double emulsified film for such work, eliminating the hazards and contaminating influences and secretions of the mouth; to provide a means of marking the film, to tell the exact location of the X-ray picture taken; to provide a means of cutting down the time of exposure, development and fixing to twenty-five per cent of the time now necessary; to provide an assured method and means, convenient in loading the film, either in dark-room under artificial light, or in open light; to provide the means and method of eliminating the possibility of foreign matter touching the tissues of the mouth and preventing the idiosyncrasies of lead or mercurial poisoning from becoming acute or pronounced after the penetration of the rays; to provide the means and method of insuring a sanitary appliance for use in the mouth and to provide therefore a pouch or rubber envelope that can be readily and easily sterilized or antisepticsized before use; to provide a means of enabling a short gap X-ray machine to obtain the most brilliant results; to provide the means of eliminating stereoscopic film work, by making unnecessary, the taking of same object at various angles to gain perspective; to insure a clean screen and avoid speckiness and eliminate haze from the film; to provide a perfect contact between screen and film, so that the reflected light from the screen will be wholly absorbed into the film emulsions and so that the rays may penetrate through the thicker bone and thicker parts and accomplish better results; to give the full actinic value to the sensitization of the emulsion coating on both sides of the film; and to provide the means and method of making a clearer and accentuated picture of contrast necessary in oral diagnosis, and eliminate fog; to use therefore the expansion of gases caused by the action of the rays upon cellulose esters when hermetically sealed in rubber envelope and/or pouch, and to use such gases for their etching and cutting value upon the emulsion of the film and thereby add distinctiveness not otherwise as yet obtainable. To provide a film holder or cassette, that will enable one to use ordinary size of film and adapt it to use in narrow confined spaces intraorally without injury to the soft tissues.

No exclusive claim is made to size and number of film or screens.

No exclusive claim is made to the use of a rubber or rubberized container.

The attainment of these objects are had, by the detailed drawings accompanying of such a holder, pouch and device, as described in which—

Figures 2, 3:
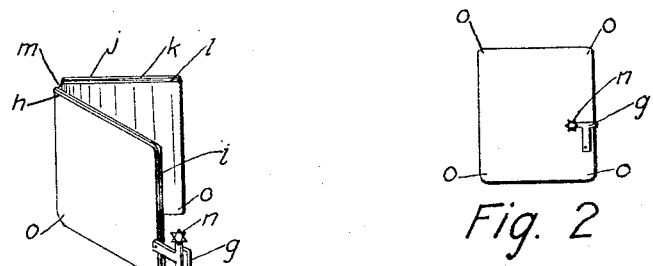
Figure 4:
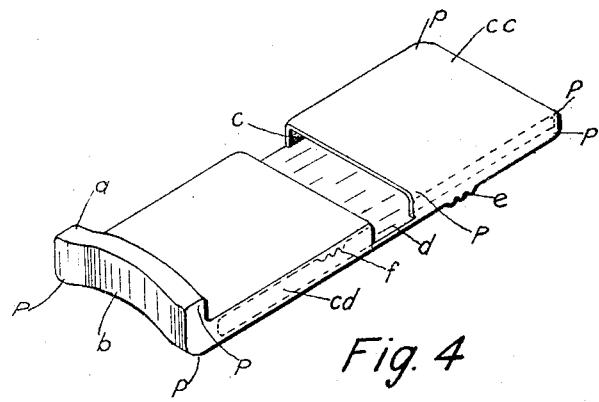

The accompanying drawing consists of four figures, showing, Figure 1, a cross sectional view of the completed device closed and ready for use in the mouth of a patient, and Figure 4, the pouch or container as a cassette ready to have Figure 2 and Figure 3, the film holder and screen inserted therein and showing two views of the film holder and screen with detail, open as well as closed, and the action of the marker and clasp.

Figure 1 is the completed device, closed, as ready for work in X-ray picture taking, and showing a cross section thereof in which *a* is the solid, though soft rubber block, and *b* showing the curve of the rubber block which is attached to or made a continuous part of *c* a rubber pouch, also made of soft rubber, of which pouch the one pouch *cc* is made smaller than the other end of the pouch *cd* which larger pouch and pocket of the full pouch is attached to or made a part of the soft rubber block *a* and *cc* fits snugly into the pouch *cd* as shown in Figure 1, and both pockets of the pouch have a strip of soft rubber *d* between them so that the pouch side *cc* may be loaded with the film holder and one pouch folded into the other and which strip *d* then acts as the outer and upper wall of the rubber pouch when used intraorally, and the pouch side *cc* has male and female corrugations *e* which corrugations are raised rubber and in between the raised rubber corrugations are depressed rubber female corrugations, which corrugations are upon the back of *cc* at an equal distance from the center of the strip *d*, so that when the pouch side *cc* is fitted into *cd*, the corrugations *e* will fit into and lock into corrugations *f*, which are also male and female corrugations, of the same substance and made in the same manner, at an equal distance from the center of the strip *d* on the inner side of the larger pouch side *cd*, and which corrugations hermetically seal the enclosed pouch, especially under expansion. Showing the cross-section of the screen and film holder Figure 3 closed and fitted into the rubber pouch Figure 4, as closed and ready for use in which *g* is the clasp, which clasp shut the celluloid envelopes containing the screen, and which holds the film between the sides. screen and/or screens of which holder, *h* is a celluloid envelope continuous around both sides, the opening on three sides being cemented together after the insertion in such envelope of *i* a fluorescent screen. formulated of fluorescent material or the fluorescent material being bound on the inside of the celluloid envelope by a binder or cemented therein, or inserted already formulated upon a cardboard, tracing cloth or material with a binder, the cementing of the three sides being with a celluloid cement. *j* is also another celluloid envelope, continuous as *h* and similarly constructed as *h*, with three sides open and cemented, and with *l* as screen of fluorescent material therein as *i*, but in this drawing *k* is shown which is a soft metal strip of lead, fitted in back of the screen *l* and at the farthest point next to the celluloid. *k* is to prevent the rays from penetrating past that point, but no claim is made of this of any special significance in this invention, and the device may be constructed without it. While the drawing shows two such enveloped screens, one may be used instead of two, and ordinary celluloid containers for the film may be so used instead of envelope and these may have no screen or screening material in them. Even these celluloid portions and screens may be omitted, the film, being of celluloid and containing cellulose esters will be sufficient when used in a rubber pouch or envelope to create gases out of their own composition, and upon expansion, during the application of Röntgen rays, will effectuate the result. The mechanism may be varied from the actual mechanical device shown, but the process is the same, and the improvement in the art is thusly obtained—*m* is the binding that connects the two celluloid envelopes together so as to connect them and permit them to be open or shut, and is made of bookbinder's cloth and cemented to each envelope.

Figure 2 shows the holder closed from a front view with the clasp *g* in position and the marker *n* on the longer side of the clasp so that the marker will come below the top line of the film and create a white spot on the developed film; *o* are the rounded corners.

Figure 3, shows the holder open to permit the film to be inserted between the celluloid envelopes and screens, and the clasp. *h* and *j* are the celluloid envelope, continuous at one end, and open at three ends, through which opening *i* in one can be seen, *e* being the screen element in one, and *l* in the other, while in the other *k* is also shown being a strip of lead metal. *m* is the binder connecting the two envelopes, made of book-binder's cloth and cemented to each of the envelopes, the open sides of the envelopes being cemented together by celluloid cement. *o* is the rounded corners of the celluloid. *g* is the clasp, made of aluminum so that Röentgen rays may pass through, and having a longer side, to which longer side *n* a marker is soldered, fused or otherwise affixed, made of lead metal, so that it, *n* the marker may come over the focus of the film and be registered on such film as a white and distinctive mark, so that the position of the film when exposed and developed may be easily designated.

Figure 4, is the rubber pouch made of soft pliable rubber having two pockets or pouches, the smaller *cc* being made to fit snugly into *cd*, the larger one, and separated by a rubber strip *d*, which forms a top or cover when *cc* is fitted into *cd*, and showing *e* the male and female corrugations, on the back of pouch *cc*, which when fitted into *cd*, lock into the male and female corrugations on the inner side of *cd*, which are shown here by *f*, and attached to and a part thereof of *cd*, at the end is *a* a solid soft rubber block, to be held intraorally by the teeth, *b* being the slight curve of the block to conform to the contour of the mouth and slightly less curved than the contour of the mouth. *p* shows the curve corners on every edge.

I claim:—

1. In X-ray in dental and oral work, a clasp and marker, the clasp composed of aluminum, one side of clasp being larger than the other and to which longer side, a marker composed of any other metal in suitable form, i. e., a star, a cross, a square, of suitable size, which is affused, soldered or otherwise affixed thereto, the clasp and marker movable to hold the film within such celluloid envelope, and the marker to be placed upon the celluloid envelope on the outside thereof toward the X-ray machine, so that the X-rays will not penetrate through such marker, so that such exposure of X-ray light will leave upon the film the outline of such marker upon film.

2. In X-ray in dental and oral work a double intensifying screen and the screens placed facing each other, each of the screens being securely enveloped in celluloid and sealed hermetically, the celluloid containers being held together by a suitable binding at one end, a thin sheet of non-penetrable metal being inserted in the one envelope back of such screen.

MICHAEL PEYSER.